UNITED STATES PATENT OFFICE.

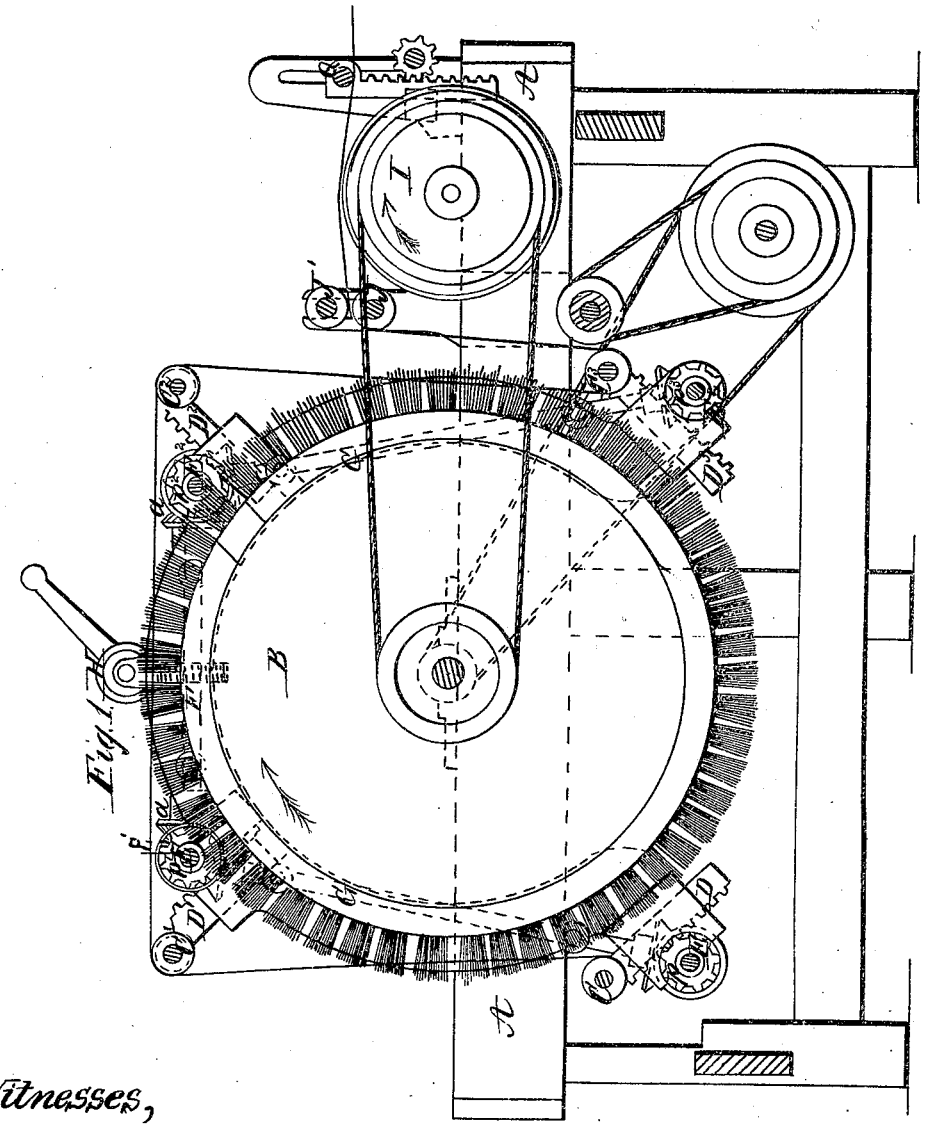

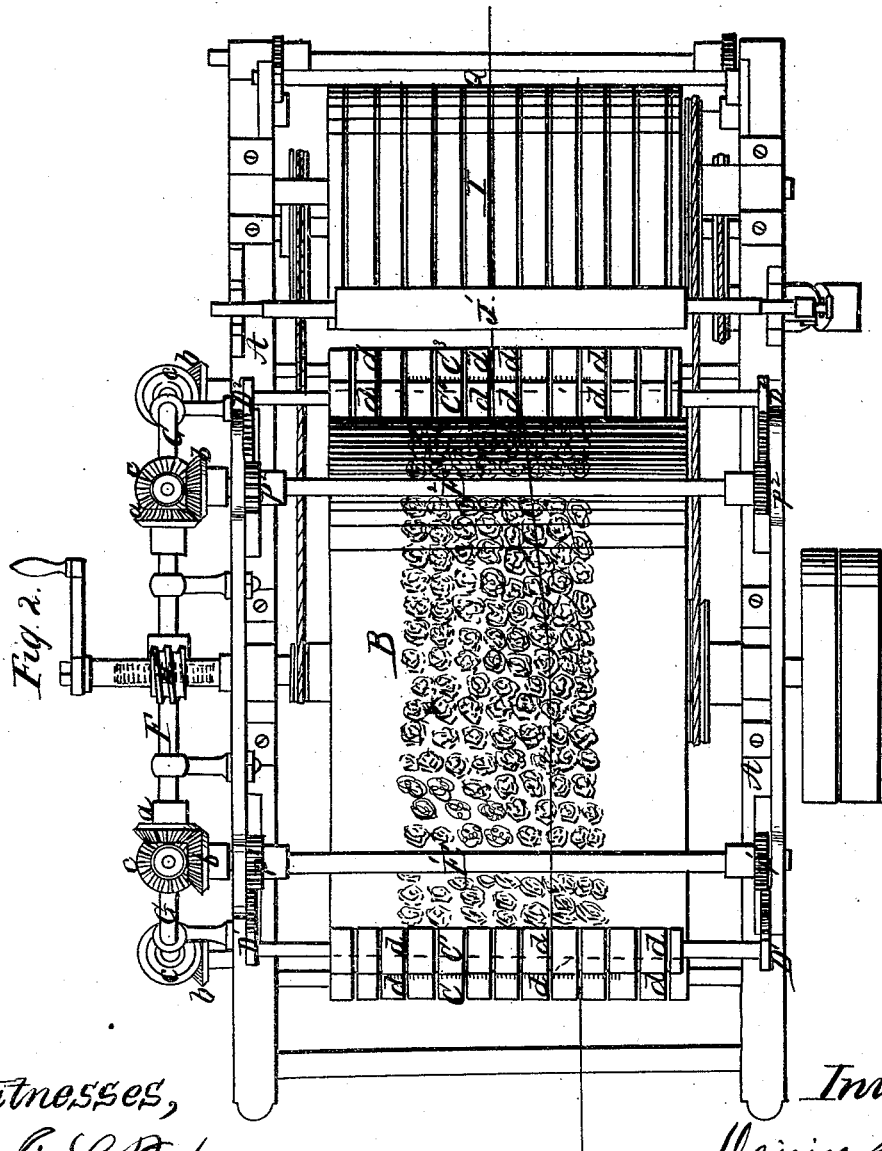

ORIGIN HALL AND TIMOTHY MERRICK, OF WEST WILLINGTON, CONNECTICUT.

THREAD-DRESSING MACHINE.

Specification of Letters Patent No. 29,484, dated August 7, 1860.

*To all whom it may concern:*

Be it known that we, ORIGIN HALL and TIMOTHY MERRICK, of West Willington, in the county of Tolland and State of Connecticut, have invented a new and useful Improvement in Machinery for Dressing and Finishing Sewing-Thread or other Threads or Yarns; and we do hereby declare that the following is a full, clear, and exact description of the same, reference being had to the accompanying drawings, forming part of this specification, in which—

Figure 1 is a vertical section taken just within, and parallel with one of the side frames of a machine exhibiting our improvement. Fig. 2 is a plan of the same.

Similar letters of reference indicate corresponding parts in both figures.

To enable others skilled in the art to make and use our invention, we will proceed to describe its construction and operation.

A, is the framing of the machine, B, is the rotary brush cylinder, having its journals fitted to turn in suitable bearings supported on said framing.

C, C', C², C³, are rollers which conduct the yarn or thread as it comes from the size boxes into contact with the brush cylinder said rollers being at equal or nearly equal distances apart and from the cylinder and parallel with the latter. The size boxes are not shown, but a thread is shown coming therefrom in Figs. 1 and 2. The above mentioned rollers derive motion from the friction of the threads passing in contact with them. The threads pass under the roller C, over those C', and C², and under C³, and by that means each thread is caused to come in contact with the cylinder in three places and to be operated upon by the cylinder three times.

The rollers C, C', C², C³ have their bearings in slides, D, D', D², D³, fitted to suitable guides in the framing, and the said rollers are provided with toothed racks to gear with pinions $p$, $p'$, $p^2$, $p^3$, on four shafts E, E', E², E³, for the purpose of enabling the said rollers to be adjusted farther from or nearer to the cylinder that the thread may enter more or less deeply into the brushes as may be desired. These shafts E, E', E², E³ are geared together by a train of shafts F, G, G', and bevel gearings $a$, $a$, $b$, $b$, $c$, $c$, that all may be operated simultaneously by turning an endless screw shaft H, which gears with a worm wheel on the shaft F.

The several rollers C, C', C², C³, have, at regular and suitable intervals apart, small grooves $d$, $d$, to receive and guide the threads; the threads are not permitted to pass directly from the grooves in one roller to the grooves in the next one in lines parallel with the planes of the cylinders revolution, but caused to pass to grooves not directly opposite to those which they are leaving, and hence are prevented from making a series of wet streaks in the brushes and leaving other parts untouched, and are caused to bring every portion of the brush into operation and thus prevent any part becoming wet or damp enough to interfere with the dressing operation. This mode of directing the threads is illustrated in Fig. 2. The thread in leaving one roller is caused by the action of the brush at the next place of contact to assume between that roller and the said place of contact a line parallel with the planes of revolution of the cylinder, but from said place of contact to the next roller it takes an oblique direction, as shown in the above mentioned figure. Without this mode of directing the threads, which is unnecessary when two or more brush cylinders are employed much difficulty might be experienced in operating upon the threads at two or more distant points of contact by means of a single brush cylinder.

I, is the polishing cylinder made of metal and heated.

J, J', are cylinders for conducting the thread from the roller C³ to the polishing cylinder, the upper one having a longitudinal motion to roll the threads upon the surface of the polishing cylinder.

Q, is a roller which assists the rollers J, J, to confine the threads to the surface of the polishing cylinder.

We do not claim the process of dressing threads or yarns by the action of a rotary brush cylinder; neither do we claim subjecting the thread or yarns in the dressing process to the repeated action of rotary brushes when the same is effected by two or more brushes as described in the patent of John M. Heck dated May 15, 1855. But

What we claim as our invention, and desire to secure by Letters Patent, is:—

1. The arrangement of the threads to pass in tangential lines to the circumference of the brush cylinder B, substantially as herein shown and described, so that each thread in its passage through the machine will be simultaneously acted upon by the same brush at some part of each tangent as and for the purpose set forth.

2. So arranging the grooves $d$, $d$, in the rollers C, C', C², C³, or so applying the threads in such grooves that the several places of contact between either thread and the brush cylinder are in different planes of revolution of the latter substantially as and for the purpose herein set forth.

ORIGIN HALL.
TIMOTHY MERRICK.

Witnesses:
J. S. PARKER,
JOHN B. CARPENTER.